Figure 1:
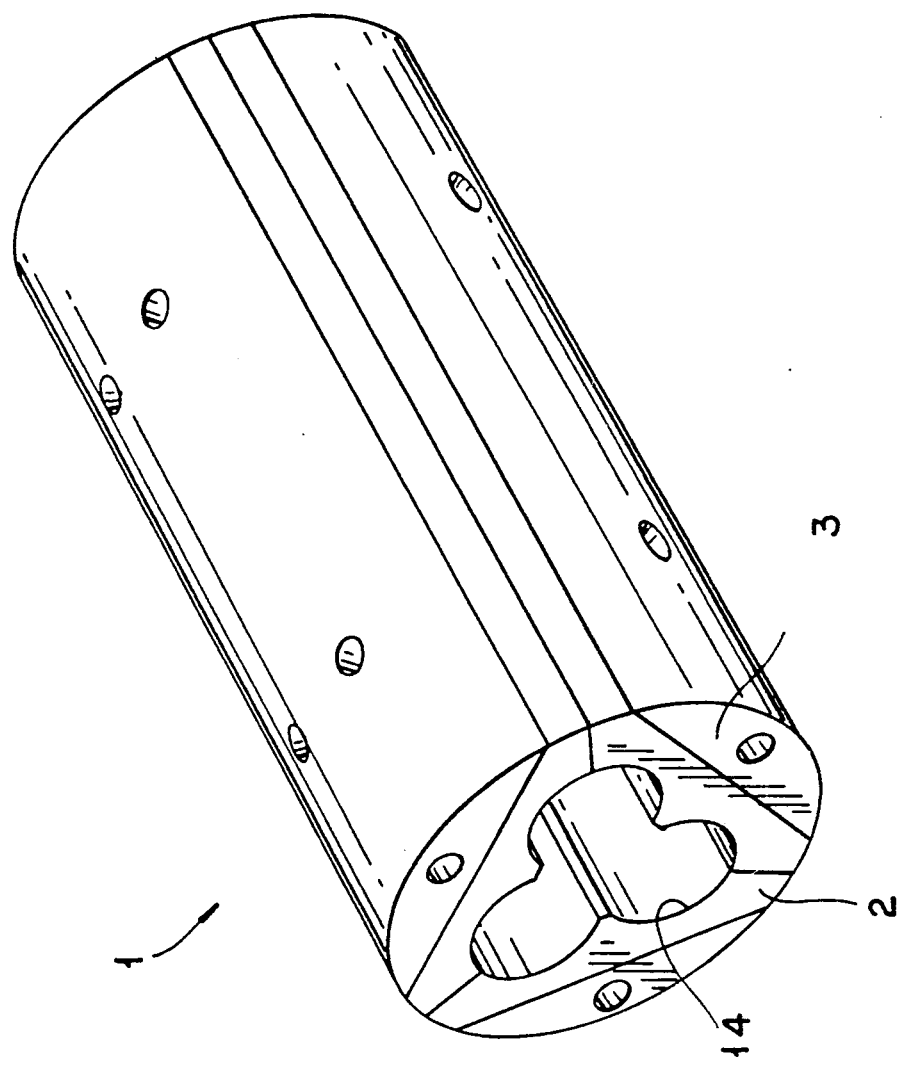

United States Patent [19]

Sørensen

[11] Patent Number: 5,050,945
[45] Date of Patent: Sep. 24, 1991

[54] APPARATUS AND METHOD FOR SPLICING LIGHT CONDUCTORS IN A COMPOSITE CABLE

[75] Inventor: Asger B. Sørensen, Ølstykke, Denmark

[73] Assignee: NKT A/S, Brondby, Denmark

[21] Appl. No.: 458,630

[22] PCT Filed: Jul. 15, 1988

[86] PCT No.: PCT/DK88/00122
§ 371 Date: Mar. 12, 1990
§ 102(e) Date: Mar. 12, 1990

[87] PCT Pub. No.: WO89/00783
PCT Pub. Date: Jan. 26, 1989

[30] Foreign Application Priority Data

Jul. 16, 1987 [DK] Denmark .............................. 3706/87

[51] Int. Cl.$^5$ .............................................. G02B 6/24
[52] U.S. Cl. .................................. 385/95; 174/88 R; 174/92; 29/871; 385/135
[58] Field of Search ....................... 174/705, 88 R, 92; 350/96.2, 96.23; 29/868, 869, 871

[56] References Cited

U.S. PATENT DOCUMENTS

| 3,718,893 | 2/1973 | Holler | 174/88 R X |
| 4,699,459 | 10/1987 | Priaroggia | 350/96.23 X |
| 4,722,588 | 2/1988 | Priaroggia | 350/96.2 X |
| 4,793,682 | 12/1988 | Cooper | 350/96.2 |
| 4,830,457 | 5/1989 | Asada et al. | 350/96.2 |
| 4,833,275 | 5/1989 | Fosse et al. | 174/88 R X |

Primary Examiner—Morris H. Nimmo
Attorney, Agent, or Firm—Ladas & Parry

[57] ABSTRACT

An apparatus and method for splicing light conductors in composite cables, in particular marine cables, comprising a plurality of spliced cable sections of power conductors and sections of light conductors. With a view to uninterrupted armouring along the entire length and thus the ability to maintain a sufficient tensile and flexural strength, the splice of the light conductors is provided at a distance from the splice of the power conductors and with a cross-sectional contour which essentially corresponds to the cable cross-section. Then the armouring is wound uninterruptedly around the cable and encloses the splices of the power conductors as well as the light conductors.

4 Claims, 3 Drawing Sheets

APPARATUS AND METHOD FOR SPLICING LIGHT CONDUCTORS IN A COMPOSITE CABLE

The invention concerns an apparatus and method for splicing light conductors in composite cables, in particular marine cables, and of the type comprising a plurality of power conductors as well as a plurality of light conductors.

Marine cables frequently have rather large dimensions because of a very strong armouring. The armouring is necessary because the cables are adapted to be laid on the sea bed, and it will be appreciated that they may be subjected to very great tensile forces both when being laid and if gripped e.g. by the anchor of a ship.

In a new cable type which, in addition to power conductors, comprises a plurality of light conductors, the cable, like other cables, is spliced at predetermined intervals, and it has been found to be a very difficult job to make a cable splice with sufficient relief for the light conductors without increasing the cable diameter considerably.

Based on purely rational considerations, it might be imagined that the power conductors as well as the light conductors might advantageously be spliced at the same site. This, however, results in an inexpedient cable cross-section in the region of splice, in the form of a large thickening of the cable, which renders it is possible in practice to effect armouring at this site by the usual armouring machine.

Secondly, a great thickening makes it very difficult subsequently to roll up the cable on a drum or rotary disc, adapted for the purpose, so that the cable easily gets tangled, and moreover, rolling-up layer upon layer may result in some bends and thus tensile and compressive stresses on each side of the splice sleeve.

Thirdly, the thickening may cause problems during laying of the cable in the form of difficult or impossible passage through the cable paying machinery of the ship and through possible equipment for ploughing or flushing the cable into the ground.

The GB Patent Application 2 169 093 A discloses a cable assembly which, in addition to pronounced cable components, comprises light conductors and has sleeves for splicing these. These sleeves are provided such that at a given splice site these are able to accommodate one or more loops of optical fibres in the diametrical or transverse direction of the sleeve. Thus, this splicing method requires the existence of a mutual gap between the juxtaposed cables.

It will be appreciated that such a sleeve structure causes an inexpedient increase in the cable cross-section at the splice region in connection with subsequent armouring of the cable.

The object of the invention is to provide a method of manufacturing a composite cable which is adapted to be armoured uninterruptedly along its entire length and thus maintain a sufficient tensile and flexural strength, and the object is moreover to provide a splice sleeve adapted for the method for use in splicing of light conductors so as to provide a composite cable having a compact, substantially cylindrical splice cross-section with a diameter which essentially corresponds to the diameter of the unspliced length of cable.

In the inventive method, the power and light conductor splices are provided mutually offset so as to even out the cable thickening preventing proper continuous armouring. Thus, the cable substantially maintains its dimensions and is thereby suitable for being rolled up, laid and optionally ploughed or flushed into the ground, and the cable has moreover uniform tensile and flexural strengths along its entire length in spite of the splices.

When a composite cable splice sleeve is constructed in accordance with this invention, a cable splice is provided where a cylindrical and minimum splice site cross-section is advantageously obtained so that the above-mentioned armouring, rolling-up and paying-out operations are facilitated.

According to the invention, the light conductor splices are disposed in the peripheral cross-sectional area of the composite cable, where also the splice sites are provided in so-called sections which are removable. This makes the composite cable easy to handle and to service.

The splice sleeves are preferably provided such that the plurality of sections, i.e. "covers", to receive the light conductors is adapted to the plurality of power conductors, thereby advantageously providing a minimal dimension and optimal roundness of the jointing sleeve.

Figure 2:
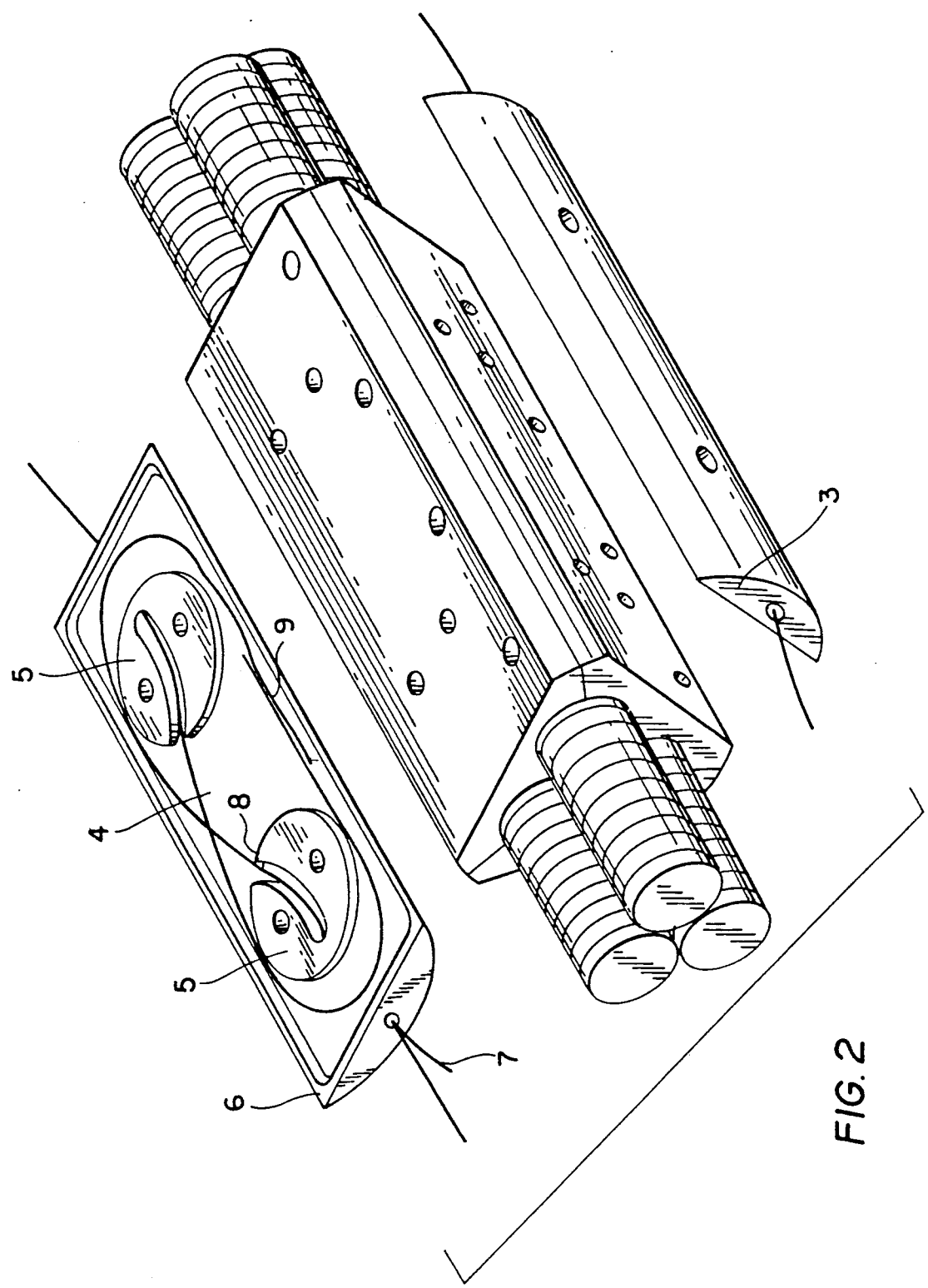
Figure 3:
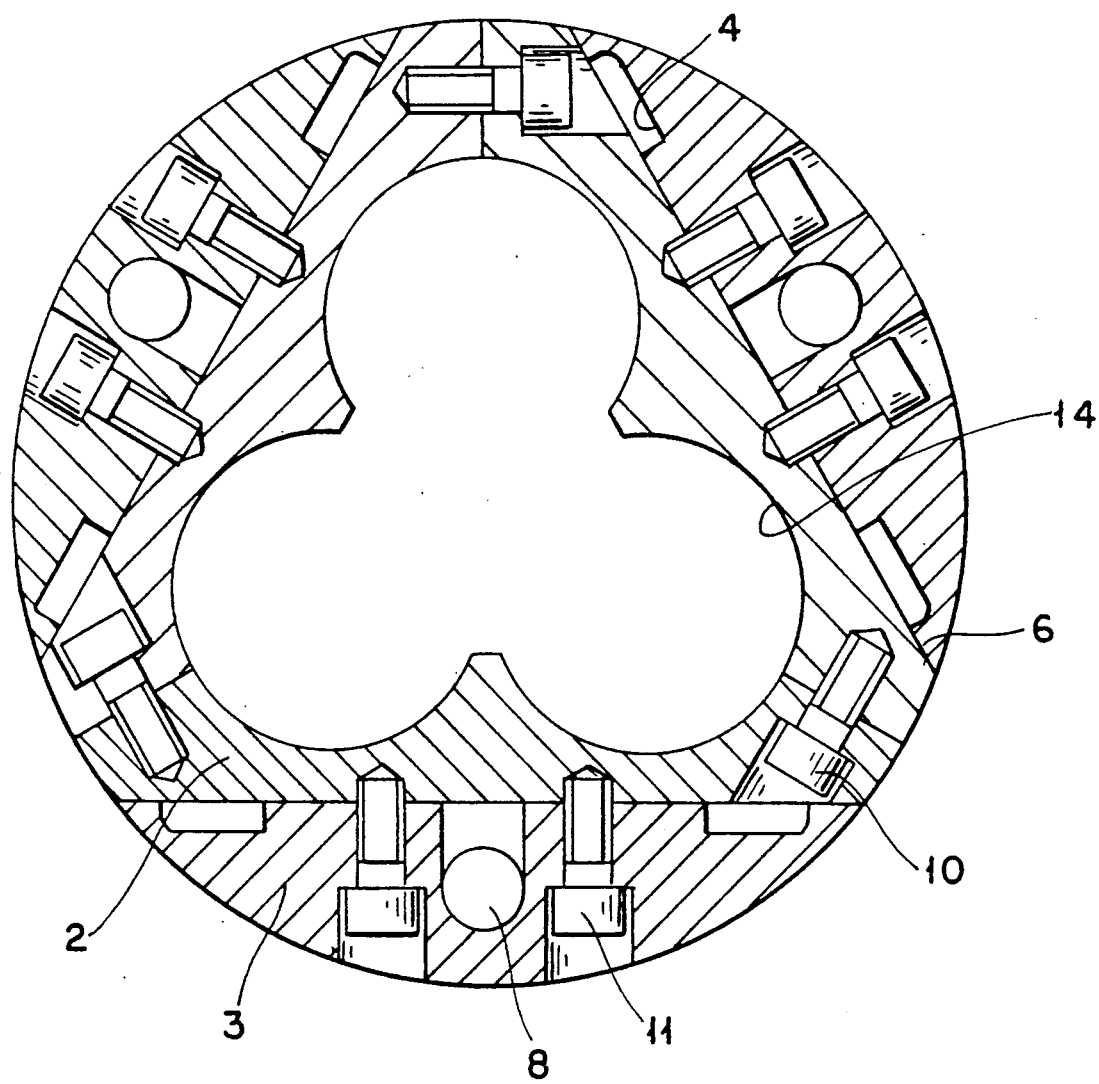

The invention will be described more fully below in a preferred embodiment with reference to the drawing, in which FIG. 1 is a perspective view of a splice sleeve according to the invention, in an assembled state, FIG. 2 is an exploded view of the splice sleeve illustrated in FIG. 1, and FIG. 3 is a sectional view of the assembled splice sleeve of the invention illustrated in FIG. 1.

FIG. 1 shows a splice sleeve 1 of the invention, shown here in an assembled form without power and light conductors. It appears that the splice sleeve substantially consists of a plurality of core members 2 adapted to be fixed around a plurality of power conductors, provided in a number of three in the illustrated case. These core members, when assembled, form the actual frame of the splice sleeve. It appears that the core members are provided with cylindrical grooves 14 to receive the power conductors so that the frame, when fixed to it, is essentially completely, sealingly engaged with the conductors. It also appears that the core members 2 are ground with external plane faces and secured to one another by means of bolts 10. The plane faces of the core members are adapted to receive a corresponding number of so-called sections or covers 3, which have the shape of cylinder segments, and which, when assembled on the frame, form, in combination with said frame, a cylinder having a diameter which essentially corresponds to the cable cross-section.

FIG. 2 illustrates the splice sleeve 1, shown here in an exploded view, and illustrating the internal shape of the sections 3. The plane face of the sections or covers 3 has a plane milled-down (recess) 4 which leaves two cylinder faces 5 co-planar with the edges of the sections. It will be seen that each of these cylinder faces is formed with a pair of transverse holes for clamping to the associated core member 2. Since the cylinder faces are flush with the edges of the sections, as mentioned, it will be appreciated that, when clamped to the core members, the sections obtain a sufficient face-to-face engagement for the clamping effected via bolts 11. It will be seen that the sections at each end are formed with a bore to receive a light conductor from both ends. Each of these bores opens into said cylinder faces 5, the actual mouth merging into a milled groove 8 which is to receive the light conductors when these have been passed through the bores 7.

With respect to splicing of the light conductors, it will thus be appreciated that the light conductors, after having been pulled through the mentioned bores in each side, undergo a splicing operation of an otherwise known type, following which the resulting, excess light conductor material is to be placed in the above-mentioned, plane milled-down portion 4. This is performed by placing the actual splice of the light conductor in a splice bearing 9 adapted for the purpose, e.g. in the form of additional milling in the milled-down portion 4. Since this light conductor splice will preferably be positioned centrally on the said excess light conductor length, the resulting two light conductor halves will have to be positioned in the cavity provided via the milling operation, in a convenient manner. This is done by utilizing the plane cylinder faces 5 as winding coils so that the light conductor lengths will be in an essentially firmly fixed state when the sections or covers 3 are clamped.

FIG. 3 illustrates a cross-section of the above-mentioned splice sleeve 1 which is shown here, like in FIG. 1, in an assembled state and likewise without power and light conductors for the sake of simplicity. It appears how the splice means, in the form of recessed bolts 10 and 11, have been rationally positioned so as to provide a cable jointing sleeve comprising a plurality of sections for the light conductor splices and having a cross-sectional contour and size which essentially correspond to the cross-section of the rest of the cable.

It will likewise be appreciated that when a splice sleeve of this type is provided where it is possible to armour around the sleeve, a structure is obtained, causing a significant relief of the light conductors, which would otherwise not be the case if the conditions for the mentioned armouring process were not present.

I claim:

1. A method of securing a light conductor splice with respect to a composite cable including light conductors and power conductors, the method comprising assembling power conductors in a bundle, disposing a sleeve around the bundle in a direction along the length of the cable, disposing an end from each of two lengths of a light conductor within a recess in a face of a cable section while the section is apart from the sleeve, splicing the two ends together, retaining the resulting splice within the recess, disposing the face of the section against the sleeve, and securing the section to the sleeve.

2. A method according to claim 1 including forming a plurality of splice containing sections, and disposing the sections around the periphery of the sleeve to form a cable of circular cross-section.

3. A splice sleeve for use in the splicing of light conductor sections in a composite cable including both light conductors and power cables, the sleeve comprising core members (2) forming an encircling housing in which power conductors are contained, and a plurality of removable sections (3) evenly distributed around the core members and adapted to contain light conductor splices, external surfaces of the sections (3) together with external surfaces of the core members (2) disposed between adjacent sections defining a substantially cylindrical surface.

4. A splice sleeve according to claim 3 for use with a composite cable including a preselected number of power conductors, and wherein the number of said removable sections is equal to said preselected number.

* * * * *